US008943109B2

(12) United States Patent
Gracie et al.

(10) Patent No.: US 8,943,109 B2
(45) Date of Patent: Jan. 27, 2015

(54) WRITE BARRIER ELISION FOR REFERENCE ARRAYS

(75) Inventors: Charles Robert Gracie, Kanata (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/031,916

(22) Filed: Feb. 22, 2011

(65) Prior Publication Data

US 2011/0246543 A1    Oct. 6, 2011

(30) Foreign Application Priority Data

Apr. 1, 2010 (CA) ..................................... 2700217

(51) Int. Cl.
*G06F 7/00* (2006.01)
*G06F 17/30* (2006.01)
*G06F 12/02* (2006.01)

(52) U.S. Cl.
CPC .................................. *G06F 12/0269* (2013.01)
USPC ...................................................... 707/816

(58) Field of Classification Search
CPC ............................................... G06F 17/30067
USPC ............................................................ 707/816
See application file for complete search history.

(56) References Cited

U.S. PATENT DOCUMENTS

| | | | |
|---|---|---|---|
| 5,819,304 A * | 10/1998 | Nilsen et al. ..................... | 711/5 |
| 5,930,807 A | 7/1999 | Ebrahim et al. | |
| 6,081,665 A * | 6/2000 | Nilsen et al. .................. | 717/116 |
| 7,089,272 B1 * | 8/2006 | Garthwaite et al. .................. | 1/1 |
| 7,404,182 B1 | 7/2008 | Garthwaite et al. | |
| 7,539,837 B1 | 5/2009 | Flood et al. | |
| 7,565,497 B1 | 7/2009 | Garthwaite | |
| 7,636,745 B1 * | 12/2009 | Detlefs .................................. | 1/1 |
| 7,653,793 B1 * | 1/2010 | Garthwaite .................... | 711/159 |
| 7,734,667 B2 * | 6/2010 | Lake .............................. | 707/816 |
| 7,779,054 B1 * | 8/2010 | Printezis et al. .............. | 707/813 |
| 7,814,130 B2 * | 10/2010 | Blandy ........................ | 707/816 |
| 7,870,170 B2 * | 1/2011 | Achanta et al. ............... | 707/816 |
| 7,953,711 B2 * | 5/2011 | Soman et al. ................. | 707/693 |
| 8,250,121 B2 * | 8/2012 | Daynes et al. ................ | 707/816 |
| 8,612,493 B2 * | 12/2013 | Micic et al. .................... | 707/813 |

(Continued)

OTHER PUBLICATIONS

"Garbage Collection (Computer Science)," Wikipedia, the Free Encyclopedia. Wikipedia Foundation, Inc. Retrieved from the Internet: <http://en.wikipedia.org/wiki/Garbage_collection_%28computer_science%29>. Retrieved on Dec. 21, 2010.

(Continued)

*Primary Examiner* — Rehana Perveen
*Assistant Examiner* — Mark E Hershley
(74) *Attorney, Agent, or Firm* — Mollborn Patents, Inc.; Fredrik Mollborn (57) ABSTRACT

A computer-implemented process for write barrier elision during program execution receives a request to overwrite a reference, determines whether garbage collection is active and responsive to a determination that garbage collection is active, determines whether a reference object has been scanned. Responsive to a determination that the reference object has not been scanned set a mark bit for the reference object in a modified mark map, the reference object is scanned and a scan bit is set for the reference object in the modified mark map.

17 Claims, 8 Drawing Sheets

(56) References Cited

U.S. PATENT DOCUMENTS

| | | | | |
|---|---|---|---|---|
| 2001/0013117 | A1* | 8/2001 | Ungar | 717/5 |
| 2002/0107880 | A1 | 8/2002 | Bacon | |
| 2004/0039758 | A1* | 2/2004 | Li | 707/206 |
| 2004/0186863 | A1* | 9/2004 | Garthwaite | 707/206 |
| 2005/0114413 | A1 | 5/2005 | Subramoney et al. | |
| 2005/0198088 | A1* | 9/2005 | Subramoney et al. | 707/206 |
| 2005/0240641 | A1* | 10/2005 | Kimura et al. | 707/206 |
| 2006/0294166 | A1* | 12/2006 | Borman et al. | 707/206 |
| 2006/0294167 | A1* | 12/2006 | Borman et al. | 707/206 |
| 2007/0022149 | A1 | 1/2007 | Bacon et al. | |
| 2007/0033240 | A1* | 2/2007 | Barsness et al. | 707/206 |
| 2007/0073794 | A1* | 3/2007 | Dahlstedt | 707/206 |
| 2007/0203960 | A1 | 8/2007 | Guo | |
| 2007/0294499 | A1* | 12/2007 | Garthwaite | 711/170 |
| 2008/0034022 | A1* | 2/2008 | Blandy | 707/206 |
| 2008/0147705 | A1* | 6/2008 | Bansal et al. | 707/102 |
| 2010/0082710 | A1* | 4/2010 | Kilner et al. | 707/813 |
| 2010/0114997 | A1* | 5/2010 | Micic et al. | 707/813 |
| 2010/0114999 | A1* | 5/2010 | Qi | 707/816 |
| 2010/0251219 | A1* | 9/2010 | Peacock et al. | 717/128 |
| 2011/0270899 | A1* | 11/2011 | Chen et al. | 707/816 |
| 2012/0158801 | A1* | 6/2012 | Devegowda et al. | 707/816 |

OTHER PUBLICATIONS

Wilson, Paul R. "Uniprocessor Garbage Collection Techniques." Proceedings of the International Workshop on Memory Management, 1992.

"Interpreted Language," Wikipedia, the Free Encyclopedia. Wikipedia Foundation, Inc. Retrieved from the Internet: <http://en.wikipedia.org/wiki/Interpreted_language>. Retrieved on Dec. 21, 2010.

"Java (Programing Language)," Wikipedia, the Free Encyclopedia. Wikipedia Foundation, Inc. Retrieved from the Internet: <http://en.wikipedia.org/wiki/Java_%28programming_languag%29>. Retrieved on Dec. 21, 2010.

"Java Virtual Machine," Wikipedia, the Free Encyclopedia. Wikipedia Foundation, Inc. Retrieved from the Internet: <http://en.wikipedia.org/wiki/Java_virtual_machine>. Retrieved on Dec. 21, 2010.

Click, Cliff; Tene, Gil; Wolf, Michael. "The Pauseless GC Algorithm." Proceedings of the 1st ACM/USENIX International Conference on Virtual Execution Environments. Jun. 11-12, 2005. Chicago, IL, USA.

"The Memory Management Glossary B." <http://www.memorymanagement.org/glossary/b.html#barrier-1>. Downloaded Dec. 21, 2010.

"The Memory Management Glossary I." <http://www.memorymanagement.org/glossary/i.html#incremental-update>. Downloaded Dec. 21, 2010.

"The Memory Management Glossary S." <http://www.memorymanagement.org/glossary/s.html#snapshot-at-the-beginning>. Downloaded Dec. 21, 2010.

Vechev, Martin T.; Bacon, David F. "Write Barrier Elision for Concurrent Garbage Collectors." Proceedings of the 4th International Symposium on Memory Management. Oct. 24-25, 2004.

Nandivade, V. Krishna; Detlefs, David. "Compile-Time Concurrent Marking Write Barrier Removal." Proceedings of the International Symposium on Code Generation and Optimization. pp. 37-48. Mar. 20-23, 2005.

"Just-in-time Compilation," Wikipedia, the Free Encyclopedia. Wikipedia Foundation, Inc. Retrieved from the Internet: <http://en.wikipedia.org/wiki/Just-in-time_compilation>. Retrieved on Dec. 21, 2010.

Biron, Benjamin; Sciampacone, Ryan. "Real-time Java, Part 4: Real-time Garbage Collection." <http://www.ibm.com/developerworks/java/library/j-rtj4/index.html>. Downloaded Dec. 21, 2010.

* cited by examiner

WRITE BARRIER ELISION FOR REFERENCE ARRAYS

CROSS-REFERENCE TO RELATED APPLICATIONS

This application claims priority to Canadian Application No. 2700217, filed on Apr. 1, 2010 and entitled "Write Barrier Elision for Reference Arrays," the entire contents of which is incorporated herein by reference.

BACKGROUND

This invention relates generally to garbage collection in a virtual machine in a data processing system and more specifically to snapshot-at-the-beginning write barrier elision during program execution in a virtual machine.

Interpreted languages such as Java allow software developers to write application code in a platform neutral fashion. (Java and all Java-based trademarks and logos are trademarks or registered trademarks of Oracle and/or its affiliates.) A platform neutral implementation is achieved by running the application code in a virtual machine (VM), which hides platform differences and provides a set of common application programming interfaces for interacting with the native machine layer. The application itself compiles into a series of byte codes which are platform independent and can be translated by the host virtual machine. The virtual machine typically also contains a just-in-time compiler (JIT) which converts the byte codes to a dynamically compiled native representation, removing much of the interpretation overhead from the virtual machine. The virtual machine also typically contains a garbage collector. Garbage collection (GC) is well known storage management technique used for automated memory management, found in interpreted programming languages as Java. Some languages, such as Java, require that a garbage collector be present, because there is no explicit language syntax for managing memory.

A typical approach of garbage collection is a Stop-The-World (STW) Mark-And-Sweep collector. The garbage collector completely halts execution of the program, and traces all the live objects (a mark phase), starting from the root set (consisting mostly of threads' stack local objects) and recursively finds the objects pointed to by the root set. After the mark phase is finished, the garbage collector sweeps the heap, for example, visiting each object. When the object was not marked during the mark phase, the garbage collector returns the associated memory to a free memory pool.

During the mark phase a live object is processed through three states represented by white (not visited yet), grey (marked, but objects pointed to are not visited yet—or simply referred as a marked object), and black (a marked object that was scanned, for example, referents have been marked—or simply referred as scanned objects). An efficient implementation typically uses a data structure referred to as a mark map to maintain information about objects being marked during a garbage collection cycle. The mark map is a highly condensed data structure, where one bit of the mark map is dedicated to represent each object on the heap storage. Scanned objects are typically not explicitly tracked. A scanned state is an implicit state that an object traverses during a tracing process.

A stop-the-world style garbage collector has to run a garbage collector cycle to completion before allowing the application to resume, which may introduce undesirable long pauses in the program execution. Stop-the-world garbage collection can be modified to operate in a concurrent or an incremental fashion. The garbage collector would proactively start execution, before the exhaustion of free memory. The mark phase (and possibly sweep phase as well) is performed concurrently or in short interleaved increments relative to the application execution. Since the live set is changing while the garbage collector is performing the mark phase (for example, the object reference graph is changing), additional techniques are required to ensure all live objects are discovered. There are essentially two techniques, based on performing extra checks and operations on each object reference write, often referred to as write barrier (WB). One technique is referred to as an incremental-update technique and the other is a snapshot-at-the-beginning (SATB) technique.

The snapshot-at-the-beginning technique encompasses two conditions. The two conditions ensure all objects that are live at the beginning of the garbage collection cycle and all objects allocated since the beginning of the garbage collection cycle are preserved as a part of the live set at the end of the garbage collection cycle.

The first condition is met by execution of Yuasa style write barrier in which any object reference overwritten pointing to an object that is not marked is remembered for eventual scanning before the end of garbage collection cycle. The second condition is met by marking newly allocated objects. The snapshot-at-the-beginning style of concurrent collector is typically less throughput efficient than an incremental-update collector. The snapshot-at-the-beginning garbage collector creates more floating garbage, and a write barrier is more complex and therefore costly to execute, but has a bounded workload, which is suitable for real-time garbage collectors.

Implementation of the snapshot-at-the-beginning incurs an expense of the write barrier. In the presence of a mark map, checking to determine whether the referent is marked involves several instructions. The operation is somewhat expensive because the program has to visit the mark map during execution that may cause a cache miss. Further the length of the operation, for example in terms of numbers of low level processor instructions, increases the difficulty for a just-in-time compiler to inline code; therefore, a subroutine may be preferred, which introduces extra jump and return instructions one instruction pair for every field write.

When a program deals with objects containing a large number of references, for example arrays, there are certain relatively lightweight operations performed that can be severely impacted by a snap-shot-at-beginning write barrier. An example is array copying, in which contents of one array are copied to another array, a common activity within a Java program. Typically, in a system without a write barrier, the array copy amounts to a simple memory copy. However, in a system with snap-shot-at-beginning write barrier, each element copied must have the destination index checked for an overwrite occurrence before the copy can take place. The checking causes a slowdown by several orders of magnitude as every slot is read, analyzed and processed, which in turn can have tremendous impact on performance.

A general rule for executing a full write barrier check on any reference may be relaxed in different ways. Several techniques successfully speed up, reduce or eliminate the write barrier checks typically addressing special use cases.

In one example, execute a write barrier on each reference slot overwrite, only if garbage collection is active. In another example, execute a write barrier on each reference slot overwrite, but optimize special cases, for example, null overwrite, before invoking a write barrier helper. In another example, in an array copy operation where the destination and source are the same, effectively a shift operation, or any array rearrangement including permutations, sorting and the like, execute a write barrier only on non-overlapping slots. This technique is safe only if there are no other mutators concurrently writing to the array, which is most often the case, but is typically difficult to determine programmatically in run-time. In another example, when newly allocated objects have all reference slots initialized to null, as determined in a static analysis, skipping the write barrier is safe. Sometimes, the use case is trivial, such as in constructors, but occasionally a just-in-time compiler needs non-trivial data flow analysis to determine when a reference slot is initialized to null. In another example, one short lived reference is covered with a long lived reference to the same objects; therefore, writes to the short lived reference can be eliminated. In another example, deferring write barriers to and combining them such that redundant writes to identical locations are eliminated. Therefore, improvements are still required for the concurrent collection style write barrier implementations.

SUMMARY

According to embodiments of the invention, a computer-implemented process, computer program product and apparatus for write barrier elision during program execution receive a request to overwrite a reference, determine whether garbage collection is active and, responsive to a determination that garbage collection is active, determine whether a reference object has been scanned, and, responsive to a determination that the reference object has not been scanned, set a mark bit for the reference object in a modified mark map, scan the reference object and set a scan bit for the reference object in the modified mark map.

BRIEF DESCRIPTION OF THE DRAWINGS

For a more complete understanding of this invention, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This invention should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present invention may be written in any combination of one or more programming languages with implicit memory management, including an object oriented programming language such as Java Smalltalk, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
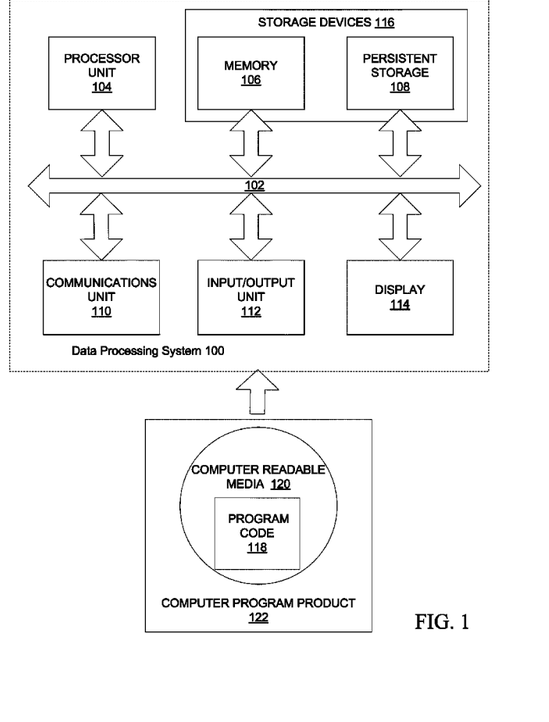
FIG. 1 is a block diagram of an exemplary data processing system operable for various embodiments.

Turning now to FIG. 1 a block diagram of an exemplary data processing system operable for various embodiments is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for write barrier elision during program execution receives a request to overwrite a reference, determines whether garbage collection is active and responsive to a determination that garbage collection is active, determines whether a reference object has been scanned. Responsive to a determination that the reference object has not been scanned set a mark bit for the reference object in a modified mark map, scan the reference object and set a scan bit for the reference object in the modified mark map. The described computer-implemented process comprises a snapshot-at-the-beginning (SATB) technique of write barrier elision.

Using data processing system 100 of FIG. 1 as an example, an illustrative embodiment provides the computer-implemented process for write barrier elision during program execution stored in memory 106, executed by processor unit 104, receives a request to overwrite a reference from communication unit 110, input/output unit 112, storage devices 116 or display 114, determines whether garbage collection is active. Responsive to a determination that garbage collection is active, processor unit 104 determines whether determines whether a reference object has been scanned. Responsive to a determination that the reference object has not been scanned, processor unit 104 sets a mark bit for the reference object in a modified mark map, stored in memory 106 and scans the reference object. Processor unit 104 sets a scan bit for the reference object in the modified mark map.

In an alternative embodiment, program code 118 containing the computer-implemented process may be stored within computer readable media 120 as computer program product 122. In another illustrative embodiment, the process for write barrier elision during program execution may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
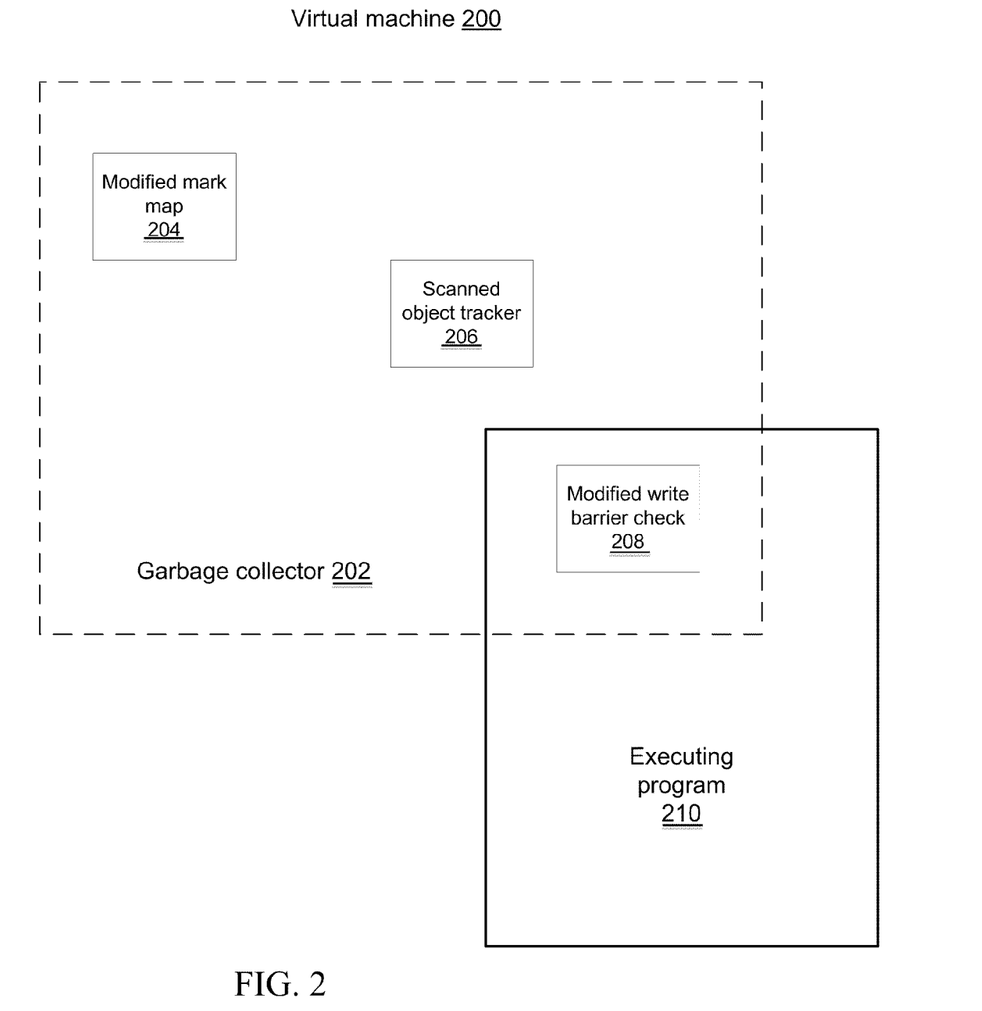
FIG. 2 is a block diagram of components of a concurrent garbage collector, in accordance with various embodiments.

With reference to FIG. 2, a block diagram of components of a concurrent garbage collector, in accordance with various embodiments is presented. Virtual machine 200 comprises two main components in the form of garbage collector 202 and executing program 210.

The two main components intersect, to form a common part represented as modified write barrier check 208. Modified write barrier check 208 is logically part of garbage collector 202, but in run-time, it is part of executing program 210.

Virtual machine 200 is a typical virtual machine, however, with the addition of a modified concurrent garbage collector in the form of garbage collector 202. Garbage collector 202 comprises a number of components to complete the garbage collection activities related to memory management including modified mark map 204, scanned object tracker 206 and a shared entity in the form of modified write barrier check 208.

The additional components ensure efficient tracking of scanned reference arrays. A hybrid mark map/scan map in the form of modified mark map 204 is created when unused bits of an available mark map are used for maintaining scan bits. Modified mark map 204 requires less memory a separate scan map. Modified mark map 204 is well suited for caching which increases the utilization of mark/scan map, because mark and scan bits are close to each other, while only marginally increasing contention in atomic updates of the map. Further the loss of not being able to track very small objects is marginal, since optimization benefits primarily from larger objects. Combined with advanced techniques of allocation cache pre-marking, objects in the cache can have a scan bit set for free and usual mark map clearing also clears scan bits for free. During tracing phase of garbage collection, scanned object tracker 206 is used to detect objects that are qualified or eligible for write back elision and write a scan bit for an object into a respective scan bit of modified mark map 204, after object is completely scanned. Scanned object tracker 206 will also set a scan bit during program execution for a newly allocated object, but only if concurrent garbage collection is currently in progress. A scan bit may also be set implicitly for newly allocated objects, by an allocation cache pre-marking operation.

Rather than using a per reference write barrier check, a potentially significant reduction of write barrier checks with programs that deal with reference arrays may be achieved using modified write barrier check 208, while introducing only a negligible overhead, in both memory and speed, of maintaining scan bit information, even when the program does nothing that produces a high number of write barrier checks. Optimization occurs during the phase while a garbage collection cycle is active, which is considered a worst-case scenario relative to a phase where the garbage collector is not active in the real-time style of collectors. Additionally, optimization is safe for a case when mutators are concurrently changing a destination array whereas in other more trivial techniques for reducing write barriers on arrays are only applicable in non-concurrent environments.

Figure 3:
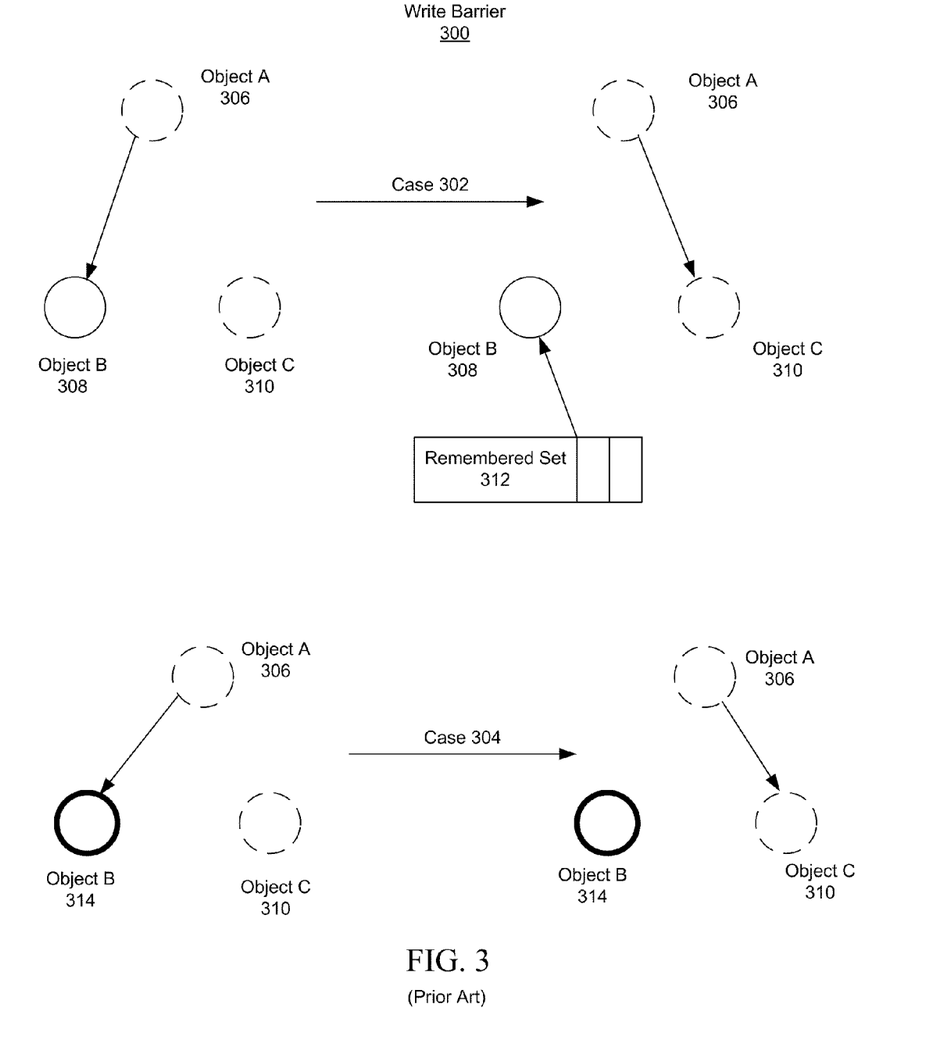
FIG. 3 is a block diagram of a snapshot-at-beginning write barrier check.

With reference to FIG. 3, a block diagram of a prior art snapshot-at-beginning write barrier check is presented. In the following example an object goes from an any state through the states of unmarked, marked, and scanned, thus later states coloring imply a previous state. For example, a thin broken line circle of an any state transitions to a thin line circle to a thick line circle and then solid circle. Write barrier 300 provides examples of a current utilization of write barrier techniques in which a reference slot in object A 306 that is pointing to object B 308 is in the process of being overwritten with a reference to object C 310. The examples are divided into case 302 and case 304. Case 302 represents the case when object B 308 is not marked. Object B 308 is added to remembered set 312 since it may be a part of a snapshot-at-beginning.

Case 304 represents a case in which object B 314 is marked. When object B 314 is marked there is no need to add object B 314 to remember set 312 as in case 302. Because object B 314 is marked the process need take no further action with regard to object B 314.

Figure 4:
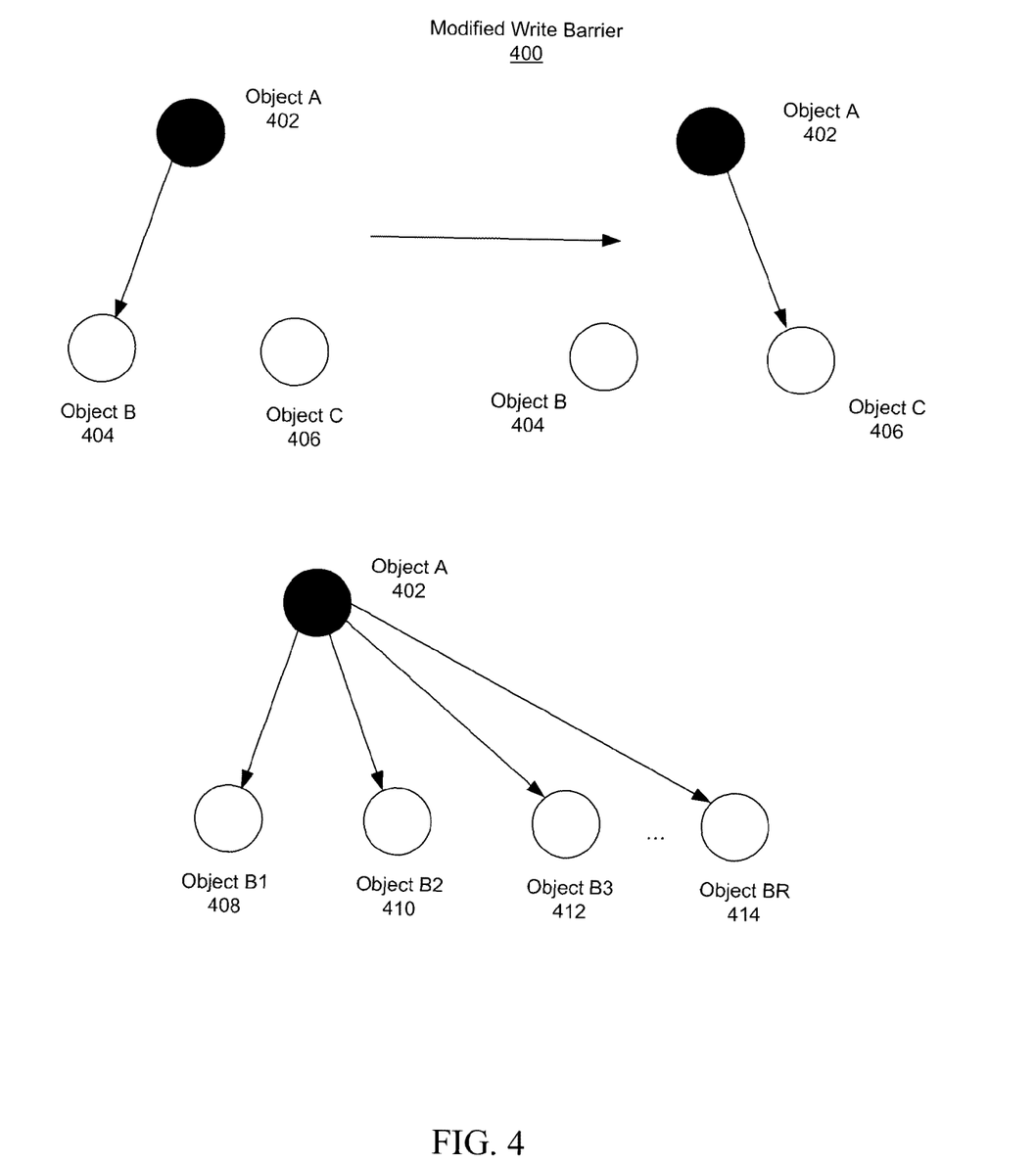
FIG. 4 is a block diagram of a modified snapshot-at-beginning write barrier check, in accordance with various embodiments.

With reference to FIG. 4, a block diagram of a modified snapshot-at-beginning write barrier check, in accordance with various embodiments is presented. In the following example an object goes from an any state through the states of unmarked, marked, and scanned, thus later states coloring imply a previous state. For example, a thin broken line circle of an any state transitions to a thin line circle to a thick line circle and then solid circle. Modified write barrier 400 provides examples of utilization of a modified write barrier technique in which a reference slot in object A 402 that is pointing to object B 404 is in the process of being overwritten with a reference to object C 406. Object A 402 contains the reference being overwritten. Object B 404, object C 406, object B1 408, object B2 410, object B3 412, and object BR 414 are referent objects. Write barrier 400 is a modified write barrier check operation performed on an object basis rather than a conventional write barrier check for example, write barrier 300 of FIG. 3.

In a first scenario, when object A 402 is scanned, according to a set scan bit in modified mark map (discussed later) no further action need be taken. However when object A 402 is not scanned, the process proceeds as in the case of an original write barrier check.

In a second scenario, when object A 402 is scanned and has a number of references slots being modified, a write barrier check is performed only once for object A 402. Each of the references of object B1 408, object B2 410, object B3 412, and object BR 414 do not require a write barrier check. The write barrier checks do not have to be performed for reference objects because the garbage collector knows the referent object was scanned. Because the garbage collector does not have to check each subordinate reference, approximately R-1 checks (sum of checks for object B1 408 to object BR 414—one check for object A 402) may be eliminated without loss of integrity.

The check performed in modified write barrier 400 is as correct as the original snapshot-at-beginning write barrier, because the reference being overwritten either still points to the original object at the moment of object scanning, thus the referent is already marked as live, or points to a new object being stored after the object scanning. The new object is either already marked by the garbage collector, being traced from its original reference(s), or newly allocated, and thus marked, or not marked. When not marked, the new object came from somewhere where it will be either marked by the garbage collector thread and enqueued for latter scanning, or it will be marked and remembered for latter scanning by the write barrier if it gets overwritten. In the case the reference may move several times, so logic needs to be applied recursively to find the original place where the write barrier will handle the reference.

There are different ways to implement the check using modified write barrier 400, but, in general, it may be no less expensive than the per reference check. Because information about scanned objects is typically not available, a modified write barrier check may require additional infrastructure for maintaining this information. When there are multiple (R) references, for example object B1 408 to object BR 414, to be overwritten within the same object, potentially R-1 write barrier checks are eliminated. When a value of R is large, as is typical with, but not limited to, reference arrays, and when there is an efficient infrastructure to track scanned objects, the reduction of write barrier checks may provide significant performance benefits. Additionally, an original write barrier check per reference and the check of write barrier 400 per object can co-exist, so the appropriate check is performed for a particular reference write (destination object), whichever is more efficient.

Figure 5:
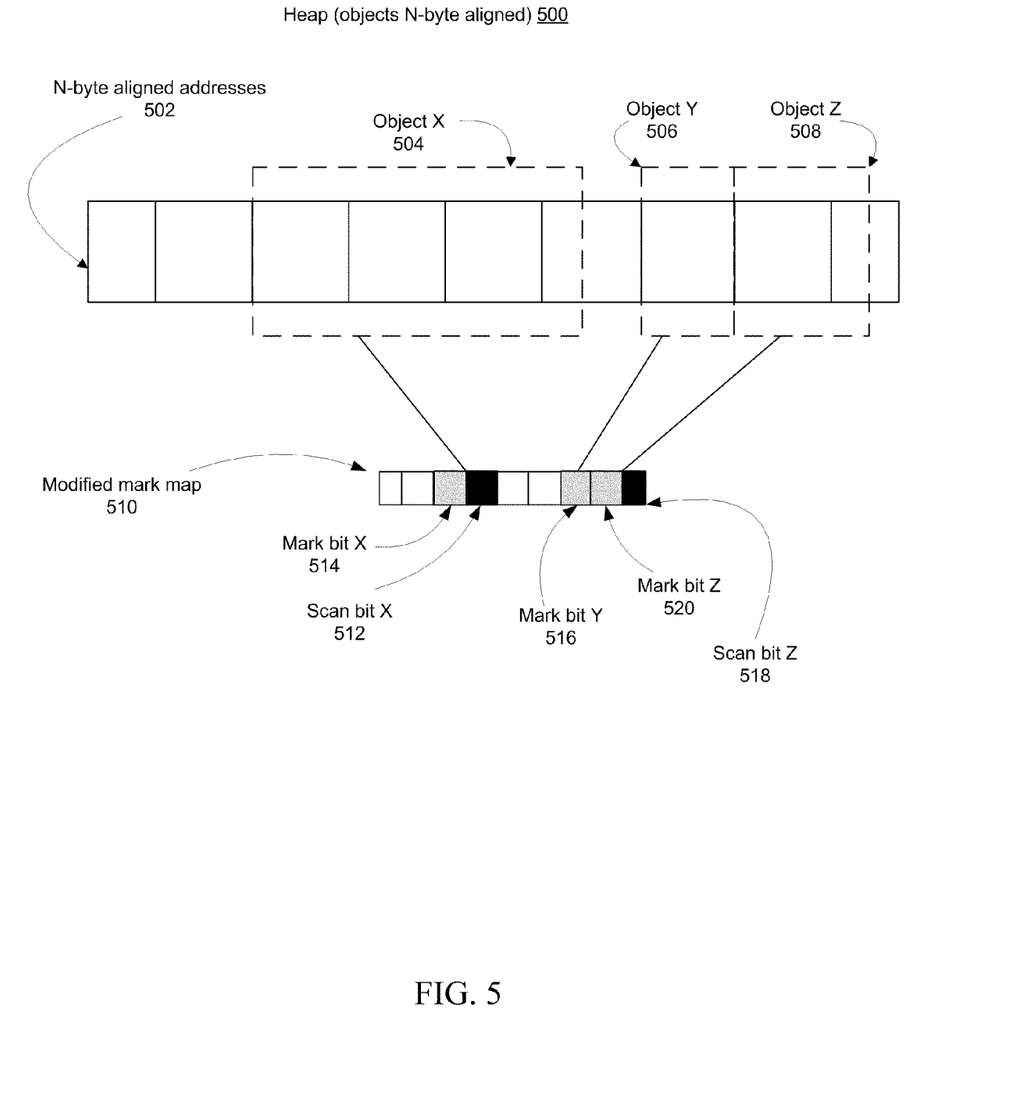
FIG. 5 is a block diagram of a mark map, associated with a heap including N-byte aligned objects, used with the concurrent garbage collector of FIG. 2, in accordance with one embodiment.

With reference to FIG. 5, a block diagram of a mark map, associated with a heap including N-byte aligned objects, used with the concurrent garbage collector of FIG. 2, in accordance with one embodiment is presented. Modified mark map 510 is an example of modified mark 204 of garbage collector 202 of FIG. 2. FIG. 5 illustrates when scan bits can be reserved for an organizations of a mark map. In the example provided, object Y is not large enough to have a dedicated scan bit.

In a typical heap representing a storage structure initialized with N-byte aligned addresses, an object can be aligned to an N-byte aligned address (typically a power of 2, like $2^3=8$), which effectively divides the heap into N-bytes chunks. Each N-byte chunk of the heap has 1 bit associated in the mark map for marking Each object will then have at least one 1 mark map bit associated for marking.

Typically, an efficient mark and sweep garbage collector does not need to explicitly track which objects have been scanned and only tracks objects that have been marked. Scanning is an indirect result of marking, but whether scanning is complete or not is usually not recorded. A straightforward implementation may use a dedicated scan map, in which the dedicated scan map is a bit map similar to a mark map. The dedicated scan map is potentially a very expensive mechanism in terms of storage cost for a single optimization, especially in situations which cannot use the modified check for few objects/arrays with a large number of references. Other approaches using a scanned bit in the object header and or a hash table of scanned objects is possible, but none of them is efficient enough to justify the new write barrier check.

Modified mark map 510 is based on the fact that a mark map renders unused bits for large objects, those larger than twice the size of the object granularity (object alignment or minimum object size associated with one bit of the mark map), available for storing scan information. For such large objects the very next bit of the mark map is always unused. Modified mark map 510 requires functionality of tracking scanned objects such as scanned object tracker 206 and a modified write barrier check 208 of garbage collector 202 of FIG. 2, that utilizes scanned object information, either in Java interpreted code/just-in-time compiled code, or in native code helpers.

A data structure particularly suited to processing using modified mark map 510 is a (relatively) large reference array processing. This is because, the reference arrays have the highest ratio of a number of reference slots to a number of total slots in the object and the total array length is often large (>10 reference slots). In addition there are operations that deal with reference arrays that have little other functionality other than overwriting references. A typical example includes copying from one reference array to another reference array (may contain object type checking per reference), and particularly where the destination and the source arrays are identical (effectively a shift operation within the array), which does not require an object type check.

Tracking scanned objects can be efficiently implemented for objects that are sufficiently larger than the N bytes of heap 500 (heap granularity) associated with 1 bit of modified mark map 510. Heap granularity is expressed either in terms of the object alignment or the minimum object size.

Heap 500 is an example of N-byte heap alignment having a set of N-byte aligned addresses 502, in which objects, such as object X 504, object Y 506, object Z 508, are strictly larger than M×N (but less or equal than (M+1)×N) bytes, there will be M+1 consecutive bits reserved for that object in modified mark map 510, 1 for actual mark bit, such as mark bit X 514, mark bit Y 516 and mark bit Z 520 and M unused bits. When the object is strictly larger than N bytes, there will be at least one bit unused. The first unused bit such as scan bit 512 or scan bit 518, when such a bit exists, associated with an object, will be used during garbage collection for maintaining information indicating whether the object is scanned.

Figure 6:
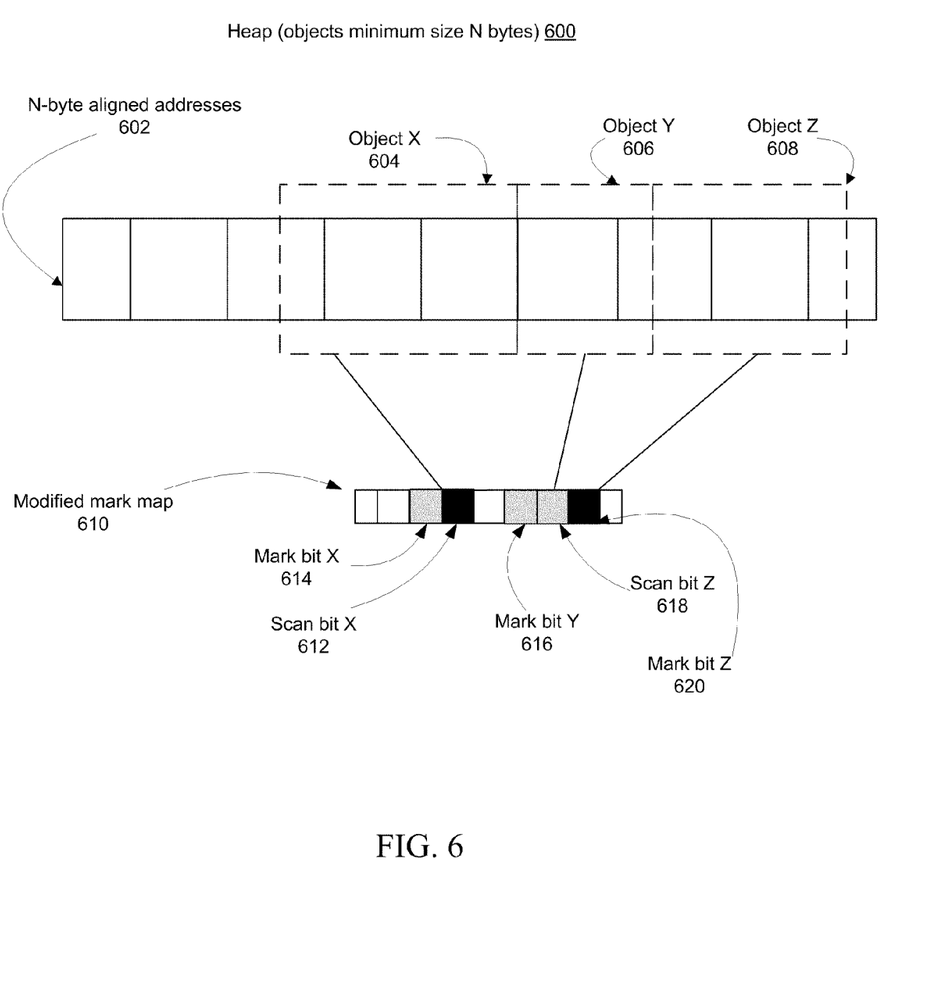
FIG. 6 is a block diagram of a mark map, associated with a heap including objects of minimum size N, used with the concurrent garbage collector of FIG. 2, in accordance with one embodiment.

With reference to FIG. 6, a block diagram of a mark map, associated with a heap including objects of minimum size N, used with the concurrent garbage collector of FIG. 2, in accordance with one embodiment is presented. Modified mark map 610 is an example of modified mark 204 of garbage collector 202 of FIG. 2. FIG. 6 illustrates when scan bits can be reserved for an organizations of a mark map. In the example provided, which is similar to FIG. 5, object Y is not large enough to have a dedicated scan bit such as scan bit X 612 or scan bit Z 618.

Heap 600 is an example of a storage structure using a minimum object size. For example, heap 600 implements N-byte aligned addresses 602 and stores object X 604, object Y 606 and object Z 608. When the object size is larger than or equal to M×N (but less than (M+1)×N) bytes, there will be M consecutive bits in modified mark map 610 associated for each object of heap 600. Modified mark map 610 uses only one bit for marking, such as mark bit X 614, mark bit Y 616 and mark bit Z 620 so when M>1, there will be M-1 bits unused. In other words, when the object is larger or equal than 2×N, there will be at least one unused bit in modified mark map 610 per each such object to track scan information.

In heap 600 the object minimum size is N bytes (again typically a power of two, like $2^4$=16), which means that when an object starts at address X, there are at most X/N objects in heap 600 at address lower than or equal to X, so the $X/N^{th}$ bit in modified mark map 610 can be safely dedicated to the object, so that no other object uses it.

The examples of FIG. 5 and FIG. 6 illustrate variations that may be used in heap management. Either example may be used to implement the technique using the modified mark map with scanning information. A choice may be made, therefore, for storage management reasons rather than whether to implement scan information.

Figure 7:
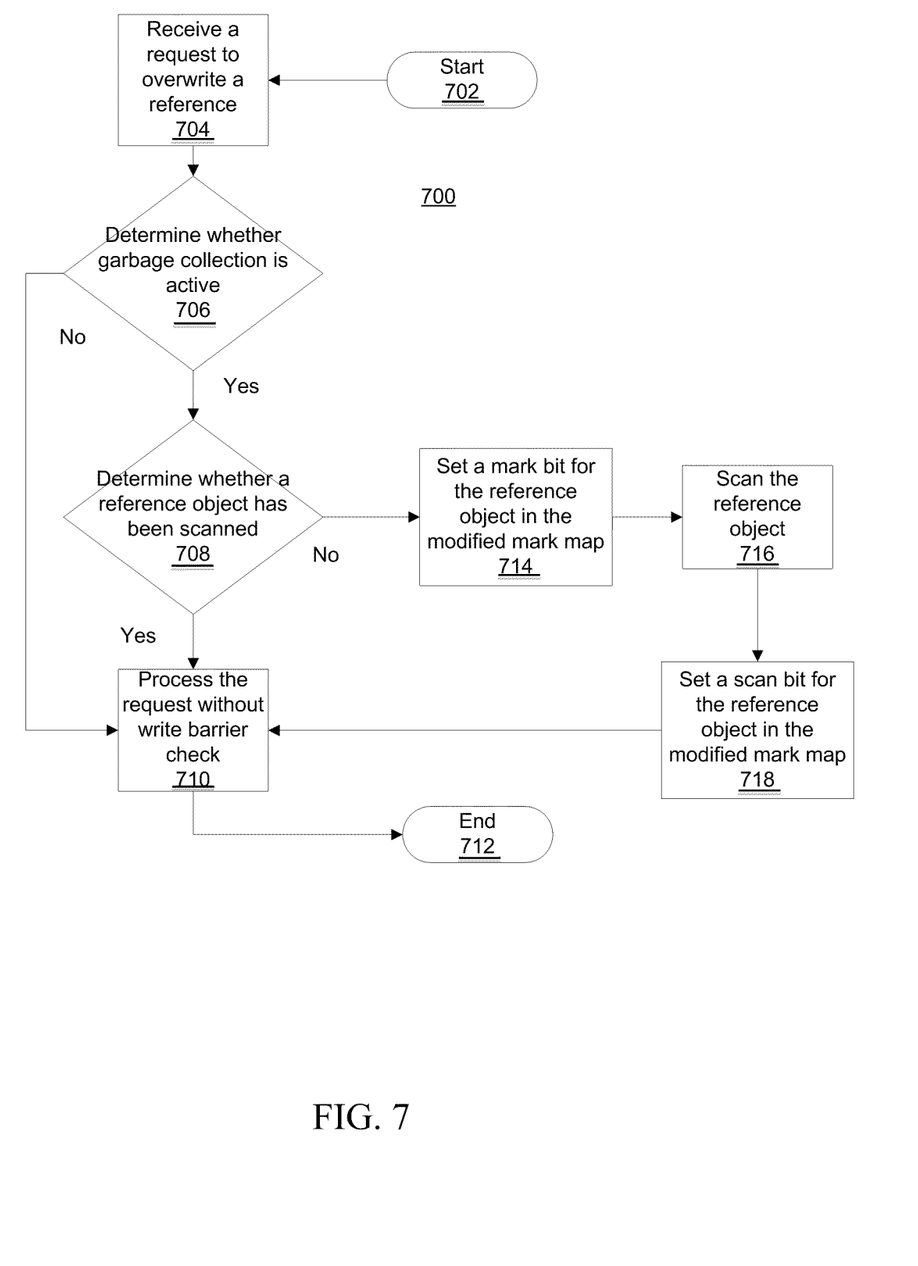
FIG. 7 is a flowchart of an overview of a process using the concurrent garbage collector of FIG. 2, in accordance with one embodiment.

With reference to FIG. 7, a flowchart of an overview of a process using the concurrent garbage collector of FIG. 2, in accordance with one embodiment is presented. Process 700 is an example of using a process including garbage collector 202, modified mark map 204, scanned object tracker 206 and modified write barrier check 208, all of FIG. 2.

Process 700 begins (step 702) and receives a request to overwrite a reference (704). The request may include one or more references to be processed. A determination is made by process 700 as to whether a garbage collection is active (step 706). When a determination is made that the garbage collection is active a "yes" result obtained. When a determination is made that the garbage collection is not active a "no" result obtained. When a "no" result is obtained in step 706 process 700 skips ahead to step 710. When a "yes" result is obtained in step 706 a determination is made as to whether a reference object has been scanned (step 708).

When a determination is made that a reference object has been scanned a "yes" result is obtained in step 708. When a determination is made that a reference object has not been scanned a "no" result is obtained in step 708. When a "yes" result is obtained in step 708, process 700 processes the requests without write barrier checks (step 710) terminating thereafter (step 712). When a "no" result is obtained in step 708, process 700 first sets the mark bit of the reference object (step 714) and than scans the reference object (step 716). Process 700 atomically sets a scan bit in the modified mark map (718) terminating thereafter (step 712).

Overwriting references happens at multiple places in the code. The places are just spots in the executable code. Those spots include interpreted code, just-in-time compiled code or where helpers or subroutines are used, for example, an array-copy helper. Each of the spots may or may not be qualified for write back check elision. A spot is qualified in terms of the disclosed process if the code deals with objects with a larger number of references (typically arrays) and garbage collection was instructed to maintain scanned bit information for such objects. The determination of whether a spot is qualified is not a run time check meaning a determination does not happen during program execution. Spots that are qualified will be instrumented with a write back elision check either manually (as in the case of helpers) ahead of program execution or programmatically but during compile time (for just-in-time compiled code), which is again ahead of program execution. Thus when referring to qualified spots) the only run-time checks are to determine whether garbage collection is active and whether an object containing the reference being overwritten is scanned.

Figure 8:
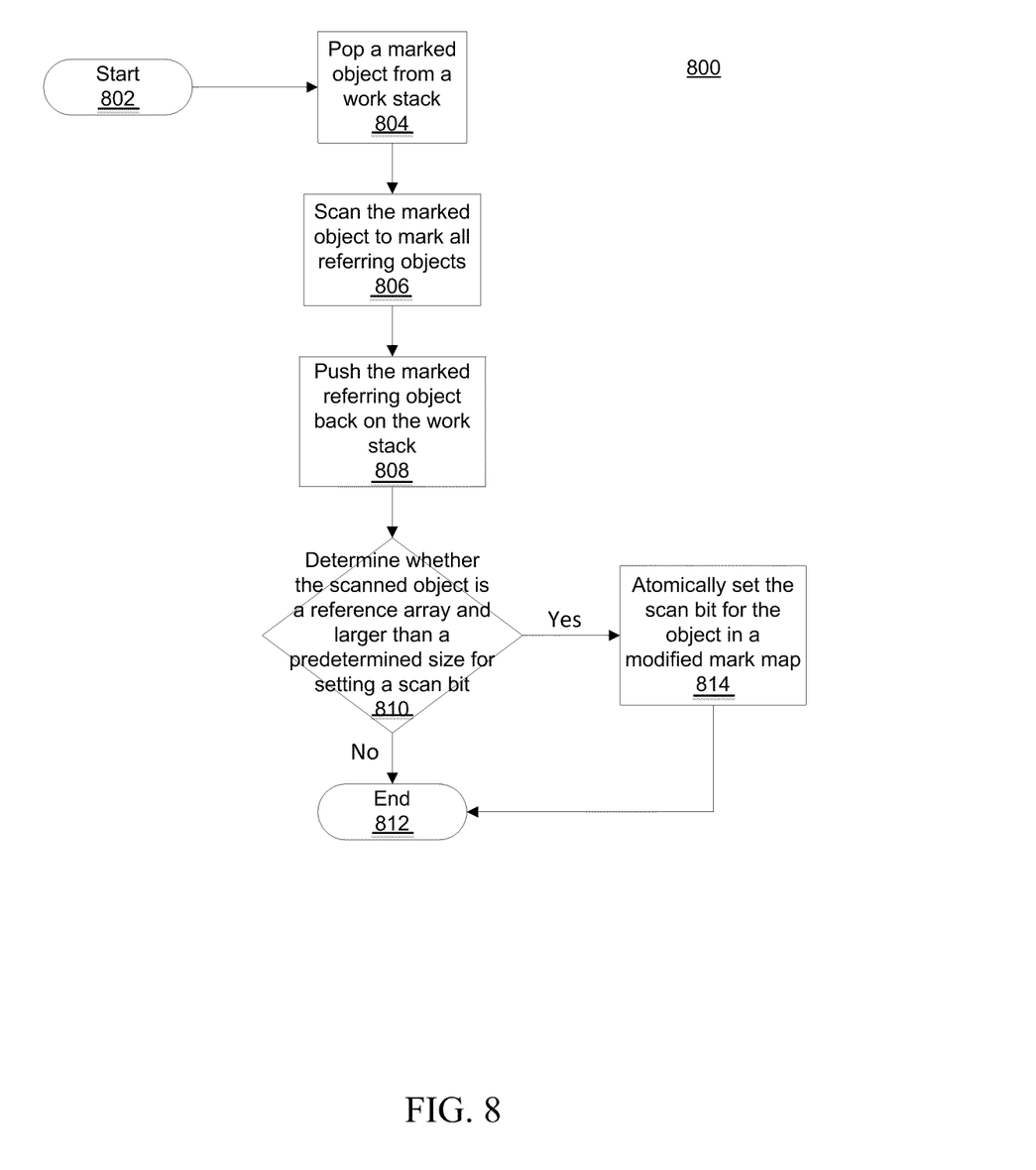
FIG. 8 is a flowchart of a process using the concurrent garbage collector of FIG. 2, in accordance with one embodiment.

With reference to FIG. 8, a marking phase of a garbage collector in accordance with an embodiment is presented. The marking phase of the garbage collector begins (step 802) and usually uses a queue (or a stack) structure containing all marked, but not scanned objects at a given moment in a garbage collection cycle. At the beginning of a mark phase, all objects from the root set are pushed to the queue or work stack. Garbage collection threads then pop a marked object from the queue or work stack (step 804). Process 800 scans the marked objects, which creates newly marked referring objects (step 806). Process 800 pushes the marked referring objects back on the queue or work stack (step 808). The garbage collection thread of process 800 determines whether the scanned object is a reference array and larger than a predetermined size for setting a scan bit (step 810).

When a determination is made that the scanned object is a reference array and larger than a predetermined size for setting a scan bit, a "yes" result is obtained. When a determination is made that the scanned object is not a reference array and larger than a predetermined size for setting a scan bit, a "no" result is obtained. When a "yes" result is obtained in step 810 process 800 atomically sets the scan bit for the object in a modified mark map (step 814) terminating thereafter (step 812). When a "no" result is obtained in step 810 process 800 terminates thereafter (step 812). Although this processing is effectively a garbage collection activity, for a concurrent garbage collector the process may occur in a context of a mutator thread as a part of concurrency taxation. A mutator thread is a effectively a Java thread, that mutates the heap. The described process occurs during the garbage collection cycle whereas the write back check occurs during program execution.

Multiple threads may be overwriting a same object at the same time. Since the triplet of checking for scan bit, scanning the object and setting the scan bit is not done as a single atomic operation, multiple threads may ultimately scan that object. While this occurrence produces redundant work, the practice is a safe operation, and does not violate the correctness of the modified write back check.

Thus a computer-implemented process for write barrier elision during garbage collection receives a request to overwrite a reference, determines whether garbage collection is active and responsive to a determination that garbage collection is active, determines whether a referent object has been scanned. Responsive to a determination that the referent object has been scanned, the computer-implemented method determines whether the referent object has multiple reference slots being modified and responsive to a determination that the referent object has multiple reference slots being modified, processes the request without a write barrier check.

The snapshot-at-beginning technique requires marking of all newly allocated objects. Since the object reference slots are initialized with null pointers, the reference could effectively be considered as scanned. Thus the scan bit of newly allocated objects should be set. For example, with an efficient implementation of allocation cache pre-marking the scan bits will be set. Allocation cache pre-marking sets all bits in the modified mark map from the bit associated from lowest possible object address of the cache to the highest possible object address of the cache. Not only bits directly associated to the possible objects will be set, but all bits (normally unused for marking) in between, if any exist, will be set as well. Thus pre-marking sets the scan bit implicitly.

Pre-marking sets all mark bits between the mark bits of the first and last object in the cache but does not change the unused mark bits of the last object in the cache that are set to 0. The original pre-marking is modified to set the first (or even all) unused modified mark bit(s) of the last possible object of the cache. When not performed as just described, the implementation does not violate any correctness because only the optimization on that last allocated object will not apply. As mentioned earlier the scan bit may also bet set explicitly by the scanned object tracker as another manner of setting a scan bit for an object.

The logic for setting/polling a scan bit is analogous to setting/polling a mark bit. Accessing the scan bit for an object at the address X, is identical to accessing the mark bit of an object at the address of X+N. Thus only slightly different code or application programming interfaces are necessary to manipulate a scan bit in a modified mark map structure such as modified mark map 204 of garbage collector 202 of FIG. 2.

The capability thus described is used in optimizing reference array processing (loop). In the case of a reference array copy, computer executed program code checks (besides determining whether a garbage collection cycle is active), whether a destination reference array is scanned. Only when garbage collection is active and the array is not scanned, will the code have to execute write barrier checks for each reference slot. Otherwise, the copying loop is free of write barrier checks. The copying loop may still have to check type (required in Java). In the case where the destination array is equal to the source array (array shift) or the leaf types of the array match, the processing loop may be as simple as a memory copy operation, which could exploit platform or hardware specific memory move optimization.

In general, any other array processing that eventually writes new values to the reference slots (including initialization, re-population, re-arrangement (sorting)) may take advantage of the scanned bits technique without need to perform a write barrier check per reference. Using the technique, it is sufficient to check when the array is scanned.

Even when the array is not scanned before entering the processing loop, the array may be scanned during the execution of the loop. The scanning operation marks all array referents and pushes the referents to the scanning queue for further processing. As noted, when the array is not scanned, a write barrier check for each reference will be executed (assuming the loop goes through all references of the array), which effectively does the same thing by marking the referent and remembering each of referent for further processing. Thus if the array is scanned, no more work will be done, other than setting an appropriate scan bit associated with the object. When the object is subject to the same processing more than once within a garbage collection cycle, any subsequent loop passes will be write barrier check free. Further, there is no need to create and maintain two different versions of the processing loop, one with a write barrier check and one without a write barrier check. By incurring a slow path hit once against an array, for the current garbage collection cycle, no further slow path occurrences are required.

However, the processing loop may only affect a portion of the array. Scanning the object may be a more expensive operation than executing write barrier checks on a subset of references. For example, array element shift operations, where elements are slid up or down within an array, take at least one reference less than length of the array. Any such object needs to be scanned eventually, so from the perspective of the described optimization, scanning sooner (on a first usage) is better, rather than latter. Performance may be maintained using a hybrid approach in which the length of the array is determined (and/or the length of the processing loop). When the length of the array is not very long and/or when the processing loop length does not significantly differ from the array length, the object is scanned.

Extremely large arrays are sometimes scanned in chunks and not atomically. The garbage collector may scan a portion of a lengthy array, and suspend or postpone further scanning to scan the resulting elements found. A garbage collection thread eventually resumes the postponed work, but may not necessarily be the original thread that started the scanning. The thread uncertainty effectively postpones setting the scan bit of the arrays, which is undesirable.

For example, when an array is split so that the chunks are scanned in parallel by different garbage collector threads, determining when the last chunk of the thread is scanned becomes difficult. In such situations, each chunk assumed to be of a fixed size S is associated with a separate scan bit. When the chunk is considered as an object in respect to mark map calculations, and chunk size S is large enough (same criteria as before when the whole object is considered), spare bits are guaranteed in the modified mark map for both mark bit (which is not needed) and a scan bit. The $K^{th}$ chunk of an array will have a scan bit at the position of a mark bit for an object at address X+(K−1)*S+N. The processing loop needs to be split and a determination made as to whether the chunk is scanned before processing each chunk.

Typical implementations, for example array copy, process arrays in an atomic, non-interruptible manner. Depending on an implementation, processing very large arrays may be subject to semi-periodic virtual machine interruptions to service work requests. These interruptions may include the starting or stopping of a garbage collection cycle, and array processing may be subject to many of these interruptions. Because of the potential interruptions, checking the "scanned" state of an array at the beginning of a loop processing the array will not suffice. At each resumption point after an interruption that may result in garbage collection cycle start or stop, the scan bit should be rechecked and the object scanned when not previously scanned, or resume with an appropriate version of the processing loop with a write barrier check when the garbage collection cycle is just started, or without write barrier check when the garbage collection cycle just finished. When splitting an array into chunks, an optimization combines the described chunk processing checks with virtual machine service checks, so that a re-check of the scan bit and potential scanning is done on appropriate chunk(s) only.

Scan bits are valid for the duration of a garbage collection cycle and have to be cleared by cycle end, or before the beginning of the next garbage collection cycle at the latest. Typically, a mark map is cleared completely before a garbage collection cycle starts or at the end of the previous cycle, which will implicitly clear the scan bits as well. Thus no additional code is necessary to implement scan bit clearing.

The described optimization is safe for concurrent modification of arrays by a mutator thread. Whether the object is being modified while concurrently being scanned or either destination or source array being modified while being copied, the modification should not affect the correctness of the optimization. This thread will remember references overwritten by the concurrent mutator thread. Any new values being exposed by the mutator thread will be treated as if the values had originally been in the object before scanning or copying started.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for write barrier elision during program execution, the computer-implemented process comprising:
    receiving a request to overwrite a reference;
    determining whether garbage collection is active;
    responsive to a determination that garbage collection is active, determining whether a reference object has been scanned;
    responsive to a determination that the reference object has not been scanned setting a mark bit for the reference object in a modified mark map, the modified mark map being created from a mark map in which bits not used for marking are used for maintaining scan bits;
    scanning the reference object;
    setting a scan bit for the reference object in the modified mark map; and
    responsive to a determination that the reference object has been scanned, processing the request without a write barrier check.

2. The computer-implemented process of claim 1, wherein scanning the reference object further comprises using a modified write barrier check to update the modified mark map.

3. The computer-implemented process of claim 1, wherein setting a scan bit for the reference object in the modified mark map further comprises:
    determining whether the scanned object is a reference array having a length greater than a predetermined length for setting a scan bit; and
    responsive to a determination that the scanned object is a reference array having a length greater than a predetermined length for setting a scan bit, atomically setting the scan bit in the modified mark map.

4. The computer-implemented process of claim 1, further comprising:
    marking a newly allocated object to form a marked object during a garbage collection phase;
    responsive to availability of a scan bit, setting the scan bit in a modified mark map for the marked object;
    adding all marked objects to a queue during the garbage collection phase;
    selecting an object from the queue to form a selected object;
    scanning the selected object to form a scanned object;
    marking all referring objects of the scanned object to form marked objects;
    setting the scan bit for the scanned object; and
    placing the marked objects in the queue.

5. The computer-implemented process of claim 1, further comprising:
    resuming processing after a virtual machine service interruption;
    determining whether the reference object was scanned;

responsive to a determination that the reference object was scanned, determining whether a garbage collection cycle started;

responsive to a determination that a garbage collection cycle started, processing the reference object with write barrier check; and responsive to a determination that a garbage collection cycle had not started, processing the reference object without write barrier check.

6. The computer-implemented process of claim 1, responsive to a determination that garbage collection is not active further comprises:

processing the request without a write barrier check.

7. A computer program product for write barrier elision during program execution, the computer program product comprising:

a non-transitory computer-readable storage medium containing computer executable program code stored thereon, the computer executable program code comprising:

computer executable program code for receiving a request to overwrite a reference;

computer executable program code for determining whether garbage collection is active;

computer executable program code for responsive to a determination that garbage collection is active, for determining whether a reference object has been scanned;

computer executable program code for responsive to a determination that the reference object has not been scanned, for setting a bit mark for the reference object in a modified mark map, the modified mark map being created from a mark map in which bits not used for marking are used for maintaining scan bits;

computer executable program code for scanning the reference object;

computer executable program code for setting a scan bit for the reference object in the modified mark map; and computer executable code for responsive to a determination that the reference object has been scanned, processing the request without a write barrier check.

8. The computer program product of claim 7, wherein computer executable program code for scanning the reference object further comprises computer executable program code using a modified write barrier check to update the modified mark map.

9. The computer program product of claim 7, wherein computer executable program code for setting a scan bit for the reference object in the modified mark map further comprises:

computer executable program code for determining whether the scanned object is a reference array having a length greater than a predetermined length for setting a scan bit; and computer executable program code responsive to a determination that the scanned object is a reference array having a length greater than a predetermined length for setting a scan bit, atomically setting the scan bit in the modified mark map.

10. The computer program product of claim 7, further comprising:

computer executable program code for marking a newly allocated object to form a marked object during a garbage collection phase;

computer executable program code responsive to availability of a scan bit, for setting the scan bit in the modified mark map for the marked object;

computer executable program code for adding all marked objects to a queue during the garbage collection phase;

computer executable program code for selecting an object from the queue to form a selected object;

computer executable program code for scanning the selected object to form a scanned object;

computer executable program code for marking all referring objects of the scanned object to form marked objects;

computer executable program code for setting the scan bit for the scanned object; and computer executable program code for placing the marked objects in the queue.

11. The computer program product of claim 7, further comprising:

computer executable program code for resuming processing after a virtual machine service interruption;

computer executable program code for determining whether the reference object was scanned;

computer executable program code responsive to a determination that the reference object was scanned, for determining whether a garbage collection cycle started;

computer executable program code responsive to a determination that a garbage collection cycle started, for processing the reference object with write barrier check; and computer executable program code responsive to a determination that a garbage collection cycle had not started, for processing the reference object without write barrier check.

12. The computer program product of claim 7, wherein computer executable program code responsive to a determination that garbage collection is not active further comprises:

computer executable program code for processing the request without a write barrier check.

13. An apparatus for write barrier elision during program execution, the apparatus comprising:

a processor unit and memory, connected by a communications fabric, in which the processor unit executes computer executable program code stored in the memory to direct the apparatus to:

receive a request to overwrite a reference;

determine whether garbage collection is active;

responsive to a determination that garbage collection is active, determine whether a reference object has been scanned;

responsive to a determination that the reference object has not been scanned set a mark bit for the reference object in a modified mark map, the modified mark map being created from a mark map in which bits not used for marking are used for maintaining scan bits;

scan the reference object;

set a scan bit for the reference object in the modified mark map; and responsive to a determination that the reference object has been scanned, process the request without a write barrier check.

14. The apparatus of claim 13, wherein the processor unit further executes the computer executable program code to scan the reference object using a modified write barrier check directs the apparatus to:

use a modified write barrier check to update the modified mark map.

15. The apparatus of claim 13, wherein the processor unit further executes the computer executable program code to set a scan bit for the reference object in the modified mark map directs the apparatus to:

determine whether the scanned object is a reference array having a length greater than a predetermined length for setting a scan bit; and responsive to a determination that the scanned object is a reference array having a length greater than a predetermined length for setting a scan bit, atomically sets the scan bit in the modified mark map.

16. The apparatus of claim 13, the processor unit further executes the computer executable program code to direct the apparatus to:

mark a newly allocated object to form a marked object during a garbage collection phase;

responsive to availability of a scan bit, set the scan bit in a modified mark map for the marked object;

add all marked objects to a queue during the garbage collection phase;

select an object from the queue to form a selected object;

scan the selected object to form a scanned object;

mark all referring objects of the scanned object to form marked objects;

set the scan bit for the scanned object; and place the marked objects in the queue.

17. The apparatus of claim 13, wherein the processor unit further executes the computer executable program code to direct the apparatus to:

resume processing after a virtual machine service interruption;

determine whether the reference object was scanned;

responsive to a determination that the reference object was scanned, determine whether a garbage collection cycle started;

responsive to a determination that a garbage collection cycle started, process the reference object with write barrier check; and responsive to a determination that a garbage collection cycle had not started, process the reference object without write barrier check.

* * * * *